United States Patent
Young et al.

(12)

(10) Patent No.: US 6,507,276 B1
(45) Date of Patent: Jan. 14, 2003

(54) TIRE PRESSURE MONITORING SYSTEM

(75) Inventors: Jorge A. Young, Claremont, CA (US); Chander P. Mittal, Rowland Heights, CA (US); Joe Huayue Zhou, Hacienda Heights, CA (US)

(73) Assignee: CM Automotive Systems Inc., Walnut, CA (US)

( * ) Notice: Subject to any disclaimer, the term of this patent is extended or adjusted under 35 U.S.C. 154(b) by 161 days.

(21) Appl. No.: 09/592,600

(22) Filed: Jun. 12, 2000

(51) Int. Cl.[7] .............................................. B60C 23/00
(52) U.S. Cl. ...................... 340/447; 340/442; 340/539; 73/146.5
(58) Field of Search ................................ 340/447, 442, 340/539, 440; 73/146.5

(56) References Cited

U.S. PATENT DOCUMENTS 6,199,575 B1 * 3/2001 Widner ........................ 137/227

* cited by examiner

*Primary Examiner*—Daniel J. Wu
*Assistant Examiner*—Phung T Nguyen
(74) *Attorney, Agent, or Firm*—Derrick Michael Reid

(57) ABSTRACT

A tire pressure monitoring system includes plurality of sensor modules having respective motion switches and pressure sensors respectively attached to the tires of a vehicle. The sensor modules communicate, by RF broadcast transmission, tire pressure messages at staggered times so that the transmitted messages to a passenger compartment monitor do not interfere with each other for improve reliable reception of the messages.

4 Claims, 9 Drawing Sheets

MONITOR DISPLAY PANEL

MONITOR DISPLAY PANEL

MONITOR DISPLAY

MONITOR RECEIVER

MONITOR RECEIVER

MONITOR CONTROLLER

SENSOR MODULE

TABLE OF COMPONENTS FIGURE 6

| REFERENCE DESIGNATION | VALUE/ DESCRIPTION | REFERENCE DESIGNATION | VALUE/ DESCRIPTION |
|---|---|---|---|
| ANT1 | Helical Antenna | R11 | 56KΩ |
| BAT1 | 9V | R12 | 5KΩ |
| C1 | 22μF | R13 | 15KΩ |
| C2,C4,C6 | 47μF | R14,R24,R40,R41 | 1MΩ |
| C3,C5,C7,C24 | .1μF | R16,R17,R23 | 33KΩ |
| C8,C13 | 10pF | R25,R27,R44 | 330Ω |
| C9,C12,C15 | 1000pF | R28 | 33Ω |
| C10,C17 – C22 | .01μF | R29 | 4.7KΩ |
| C11,C16,C23 | 68pF | R32 – R38 | 100Ω |
| C14,C29 | 100pF | R43 | 47KΩ |
| C25,C26 | 22pF | R45 | 1.02KΩ |
| C27 | 470pF | R46 | 14.7KΩ |
| C28 | 1μF | R50 | 470KΩ |
| C30 | 1.5pF | R51 | 200KΩ |
| C31 | 33pF | S1 | 30ETL9E |
| CR1 | 1N4004 | S2 | Motion Switch |
| D1 – D4 | CMD57123 | U1,U2 | LA-301VL |
| D5 | HLMP1700 | U3 | TC10543VCT |
| J1 | Connector | U4 | M7805 |
| J2 | +12V Input | U5 | OPA2343 |
| J3 | Connector | U6 | HSMS2850 |
| L1,L3 | 56μH | U7 | RF1172 |
| L2,L4 | 3.3μH | U8 | SFE10.7MA21 |
| L5 | 18ηH | U9 | UPC27487 |
| LP1 | SPR-505MVW-T31 | U10 | UPC2768GR |
| LS1 | Speaker | U11 | TCM809MENB |
| Q1,Q6 | PNP | U12 | PIC16C62 |
| Q2 – Q5 | NPN | U13 | 93C46B |
| Q7 | BFR92A | U14 | TC55RP50 |
| R1,R2,R9,R10,R15, R18 – R22,R26,R30, R31,R42,R47 – R48 | 10KΩ | U15 | PIC12C671 |
|  |  | U16 | 24LC00 |
|  |  | U17 | LM6062 |
| R3 – R8,R39 | 390Ω | U18 | SM5310 |

TABLE OF COMPONENTS FIGURE 6A

| REFERENCE DESIGNATION | VALUE / DESCRIPTION |
| --- | --- |
| ANT1 | Helical Antenna |
| BAT1 | 9V |
| C1 | 22$\mu$F |
| C2,C4,C6 | 47$\mu$F |
| C3,C5,C7,C24 | .1$\mu$F |
| C8,C13 | 10pF |
| C9,C12,C15 | 1000pF |
| C10,C17 – C22 | .01$\mu$F |
| C11,C16,C23 | 68pF |
| C14,C29 | 100pF |
| C25,C26 | 22pF |
| C27 | 470pF |
| C28 | 1$\mu$F |
| C30 | 1.5pF |
| C31 | 33pF |
| CR1 | 1N4004 |
| D1 – D4 | CMD57123 |
| D5 | HLMP1700 |
| J1 | Connector |
| J2 | +12V Input |
| J3 | Connector |
| L1,L3 | 56$\mu$H |
| L2,L4 | 3.3$\mu$H |
| L5 | 18$\eta$H |
| LP1 | SPR-505MVW-T31 |
| LS1 | Speaker |
| Q1,Q6 | PNP |
| Q2 – Q5 | NPN |
| Q7 | BFR92A |

TABLE OF COMPONENTS FIGURE 6B

| REFERENCE DESIGNATION | VALUE/DESCRIPTION |
|---|---|
| R1,R2,R9,R10,R15,R18 – R22,R26,R30,R31,R42, R47 – R48 | 10KΩ |
| R3 – R8,R39 | 390Ω |
| R11 | 56KΩ |
| R12 | 5KΩ |
| R13 | 15KΩ |
| R14,R24,R40,R41 | 1MΩ |
| R16,R17,R23 | 33KΩ |
| R25,R27,R44 | 330Ω |
| R28 | 33Ω |
| R29 | 4.7KΩ |
| R32 – R38 | 100Ω |
| R43 | 47KΩ |
| R45 | 1.02KΩ |
| R46 | 14.7KΩ |
| R50 | 470KΩ |
| R51 | 200KΩ |
| S1 | 30ETL9E |
| S2 | Motion Switch |
| U1,U2 | LA-301VL |
| U3 | TC10543VCT |
| U4 | M7805 |
| U5 | OPA2343 |
| U6 | HSMS2850 |
| U7 | RF1172 |
| U8 | SFE10.7MA21 |
| U9 | UPC27487 |
| U10 | UPC2768GR |
| U11 | TCM809MENB |
| U12 | PIC16C62 |
| U13 | 93C46B |
| U14 | TC55RP50 |
| U15 | PIC12C671 |
| U16 | 24LC00 |
| U17 | LM6062 |
| U18 | SM5310 |

TIRE PRESSURE MONITORING SYSTEM

REFERENCE TO RELATED APPLICATIONS

The present application is related to copending application entitled Tire Pressure Sensory and Monitoring Method, Ser. No. 09/333,893, filed Jun. 16, 1999, by the same inventors.

The present application is related to copending application entitled Tire Pressure Sensory and Monitoring System, Ser. No. 09/333,892, filed Jun. 16, 1999, by the same inventors.

The present application is related to copending application entitled "Tire Pressure Sensory Monitoring Method", Ser. No. 09,592,500, filed Jun. 12, 2000, by the same inventors.

FIELD OF THE INVENTION

The invention relates to the field of to a method and apparatus for monitoring air pressure in vehicle tires. More particularly, the invention relates to an apparatus for automatically sensing tire pressure and methods for operating the apparatus.

BACKGROUND OF THE INVENTION

Tire pressure sensors have long been used to sense the pressure of tires to indicate when the tire is below a predetermine tire pressure. These sensors use various means, typically diaphragms screwed into tire value stems and responsive to tire pressure for activating an electrical switch for generating an alarm. Various types of tire monitoring systems have been used to provide continuous vehicle tire pressure sensing and monitoring during vehicular operation. Such systems typically include a monitor located in the passenger compartment of the vehicle for receiving encoded transmitted signals for respective tires and for alerting the vehicular operator through the use of audio alarms and graphic display indicators. The ability to selectively sense the pressure of each tire is desirable so that the subject tire can then be inflated to proper air pressure levels for safety and long tire wear life. The tire sensors unidirectionally communicate with the monitor transmitting tire pressure values received and processed by the monitor. Hence, these systems typically have tire pressure sensors located on the valve stems for the respective tires each with an associated embedded transmitter for generating respective encoded signals identifying the tire. The cab mounted monitor has a receiver the graphic display for alerting the operator in the event of low tire pressures.

U.S. Pat. No. 4,814,745 issued to Wang on Mar. 12, 1989 discloses a cap like signal device attached to the tire for sensing tire pressure. The cap includes an electric alarming buzzer responsive to a disk actuated by pressure disadvantageously without a cab mounted monitor. The disk activates the buzzer when the tire pressure is too low. U.S. Pat. No. 4,814,744 issued to Collins on Mar. 21, 1989 discloses a low tire pressure warning system having a mechanical side wall sensor with and dash alarm disadvantageous connected by a cable. U.S. Pat. No. 4,804,808 issued to Dal Cero on Feb. 14, 1989 discloses a pressure sensing devices that senses low tire pressure and signal low pressure using a transmitter and cab mounted receiver. U.S. Pat. No. 4,694,273 issued to Franchino on Sep. 15, 1987 disclose a tire sensing device having a movable element which activates a radio transmitter signal received by a receiver in the passenger compartment to activate visual and acoustic alarms. U.S. Pat. No. 5,289,161 issued to Huang on Feb. 22, 1994 discloses a tire pressure sensor having a diaphragm in a casing. The spring loaded diaphragm is movable between two positions. A signal producing units is activated in response to the position of the diaphragm. The signal generated is an encoded modulated RF signal for communicating an alarm signal to a receiver that determines which tire is low and activates a corresponding indication to indicate which tire has low tire pressure. Fuses in the sensors are used to generate the respective codes to match indicators of a display. U.S. Pat. No. 5,694,111 issued to Huang on Dec. 2, 1997 discloses an encoder unitand transmitter circuit for a tire pressure sensor device for generating encoded RF signals received by a cab receiver operating a display units. U.S. Pat. No. 4,734,674 issued to Thomas on Mar. 29, 1988 also discloses a tire pressure sensing device that, upon low pressure, transmits an encoded signal to a cab receiver having a plurality of display indicators on a front panel that are selectively activated to indicate the respective tire. U.S. Pat. No. 4,737,760 issued to Huang on Apr. 12, 1988 discloses another valve stem tire pressure warning device having a pressure sensitive diaphragm and spring switch for activating a transmitter signal communicated to the cab monitor. U.S. Pat. No. 4,319,220 issued to Pappas on Mar. 9, 1982 disclose a system for monitoring tire pressure of the tires having respective transmitters communicating alarm signals to a receiver in the cab monitor. U.S. Pat. No. 5,001,457 issued to Wang teaches a cab mounted monitor having displays with a graphic display for visually indicating which tire is low through the use of digitally encoded signals transmitted between respective tire sensor transmitters and the cab mounted central receiver. U.S. Pat. No. 4,970,491 issued to Saint on Nov. 13, 1990 teaches the use of specially encoded signal for a fleet of vehicle so that the receivers of one fleet of vehicle will not be activated by encoded signal from a sensor in another fleet of vehicle.

Typically, these systems teach valve mounted tire pressure sensors responsive to respective tire pressures of the tires for generating respective encoded signals transmitted to receiver in a cab mounted monitor having graphic visual displays and or audio alarms for indicating which one of the tires has low tire pressure. Typically, these signal are modulated at a fix radio frequency. However, these teaching do not address the problem of interference between signals from sensor on the same vehicle, which signals are modulated at the same frequency resulting in poor reception by the receiver, which may cause a failure of the monitoring system that fails to provide the operator with expedient current tire pressure indications and alarms. Additionally, these prior systems do not enable easy methods of modifying the assignment between the tire positions and the respective code of the valve stem mounted sensors, for example, when the sensor is dysfunctional, lost or stolen. These and other disadvantages are solved or reduced using the invention.

SUMMARY OF THE INVENTION

An object of the invention is to provide a vehicular tire pressure monitoring system that synchronizes radio transmissions from tire sensors transmitters to reduce potential interference between simultaneously transmitted tire pressure signals from the tire pressure sensor transmitters located on respective tires.

Another object of the invention is to provide tire sensor motion detection switches for synchronizing tire pressure signal transmissions from respective tire pressure sensor transmitters to reduce potential interference between simultaneously transmitted tire pressure signals.

Still another object of the invention is to method for reassigning the tire pressure sensor identification codes to respective tire locations.

The present inventions are directed to a vehicular tire pressure monitoring system that time division synchronizes transmitted tire pressure signals from respective tire sensor modules to prevent the transmitted signals from the interfering with each other for improved tire pressure monitoring. Each tire sensor module is attached to the valve of a respective tire the tire sensor module includes a motion detector switch that is activated when the vehicle is in motion through rotating tires that spin the sensors. Upon the detection of motion, battery power is routed to sensor electronics so that the sensor is powered during vehicular motion but remains dormant during periods of inactive vehicular motion so as to conserve sensor battery power. Each sensor module is individually configured to transmit respective tire pressure signals, including encoded identification codes, at differing non-overlapping time intervals so that the transmitted signals are staggered over time for time division synchronization. As such, the signals are transmitted at different times so as to prevent cross interference between these signals thereby improving the reception of these signals by the receiver of the monitor in the passenger compartment.

In another aspect of the invention, the individual sensor modules can be activated preferably by vehicular motion to transmit the respective identification code signals received by the receiver in the monitor that is manually programmed into a code assignment mode that selects, using a display panel, the desired tire location and then assigns that tire location to the new identification code upon reception of the transmitted signal from a respective sensor module. This ability to reassign the sensor identification code enables the replacement of sensors that may have become defective, lost or stolen. These and other advantages will become more apparent from the following detailed description of the preferred embodiment.

BRIEF DESCRIPTION OF THE DRAWINGS

FIG. 6 is a table of part lists indicating component values for the monitor display, monitor receiver, monitor controller and tire sensor module.

DETAILED DESCRIPTION OF THE PREFERRED EMBODIMENT

An embodiment of the invention is described with reference to the figures using reference designations as shown in the figures. Reference is continually made throughout this description to FIG. 6 indicating component values. The vehicle tire pressure monitoring system consists of battery-powered components that are referred to as the monitor and the sensor module, shown by way of schematic representation in FIGS. 1 through 4b, and FIG. 5, respectively. Together, these devices monitor air pressure in the tires of a vehicle, not shown, for alerting the driver in the event that the tire pressure drops below a preprogrammed tire air pressure level. A typical four tire monitoring system consists of the monitor that is mounted inside the vehicle passenger compartment and four small tire air pressure sensor modules respectively securely attached to the valve stems of the tires. The sensor modules are encased in a small plastic housing, not shown, with suitable threads for valve stem attachment. The monitor may also be enclosed in a small plastic housing, not shown, and can be dash mounted, if desired, for receiving power from the vehicular battery, also not shown.

Figure 1:
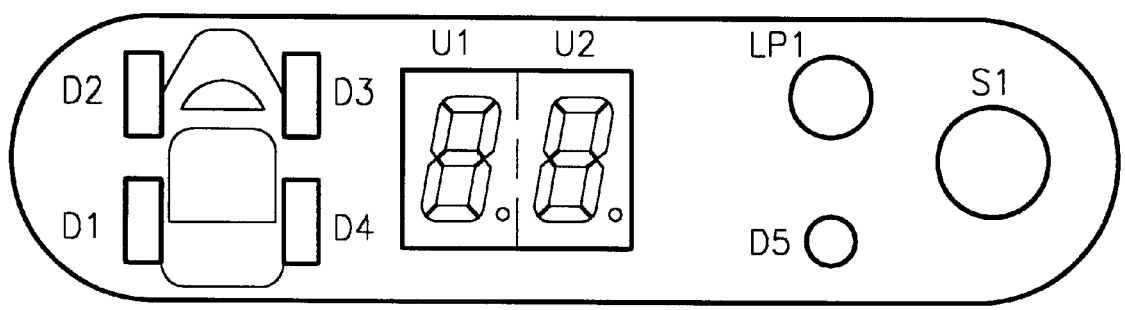
FIG. 1 is drawing depicting a monitor display panel.
Figure 2:
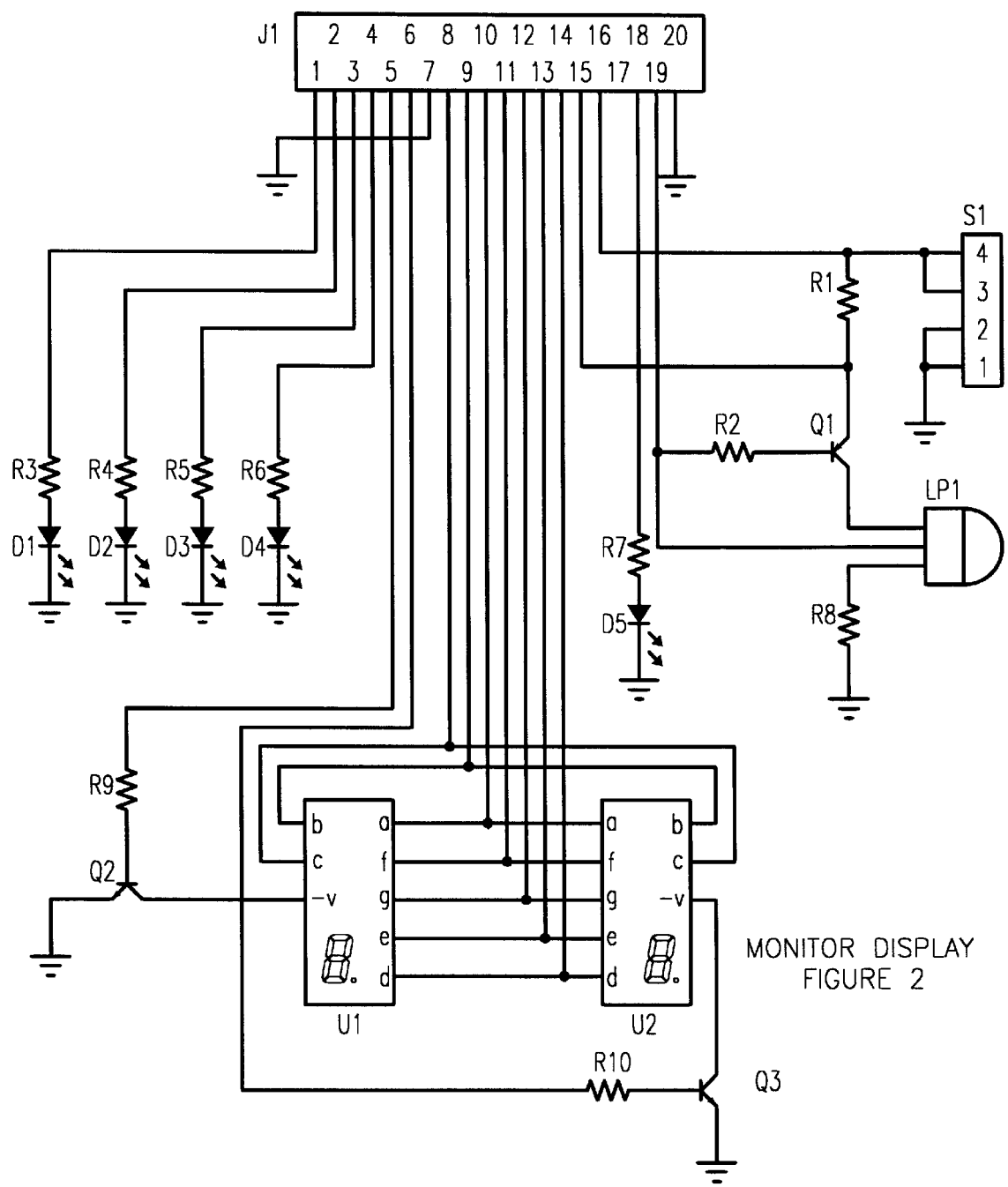
FIG. 2 is schematics for the monitor display.

Now, referring specifically to FIGS. 1 and 2, the monitor display panel shows a graphic representation of a vehicle through the use of light emitting diodes (LEDs) D1, D2, D3 and D4 indicating respective tires locations, for example, indicating back left, front left, front right and back right tire locations, respectively, for the exemplar four wheel vehicle. The display panel also includes a light emitting diode D5 for indicating a low battery level of the sensor module. A high voltage logic one level through resistors R3, R4, R5, R6 and R7 will light up light emitting Diodes D1, D2, D3, D4 and D5, respectively. The monitor display further includes a plurality of numerical indicators, such as displays U1 and U2, which may be for example, two conventional seven segment numerical displays for indicating two digit tire pressure values. Displays U1 and U2 are used to display the sensed tire pressure and tire pressure trigger level when the monitor is in a programming trigger mode. Display U1 shows the most significant digit and display U2 shows the least significant digit. The two numeric seven segment displays U1 and U2 have respective activation transistors Q2 and Q3, with respective base resistors R9 and R10. A miniature programming switch S1 is used for operator programming and for displaying tire pressures. A dual color LED LP1 emits a green color indicating proper monitor operation and proper operating tire pressures, and emits a red color indicating malfunctioning of the monitor or improper tire pressures, such as a low tire pressure. The LED LP1 has a drive transistor Q1 with a pull resistor R1, base resistor R2 and ground resistor R8. The monitor display is typically exposed for viewing in a passenger compartment, not shown, of the subject vehicle, also not shown, that is represented by LEDs D1, D2, D3 and D4. Connector J1 connects the display panel electronic of FIG. 2 to a connector J3 of the monitor controller of FIG. 4.

Figure 3A:
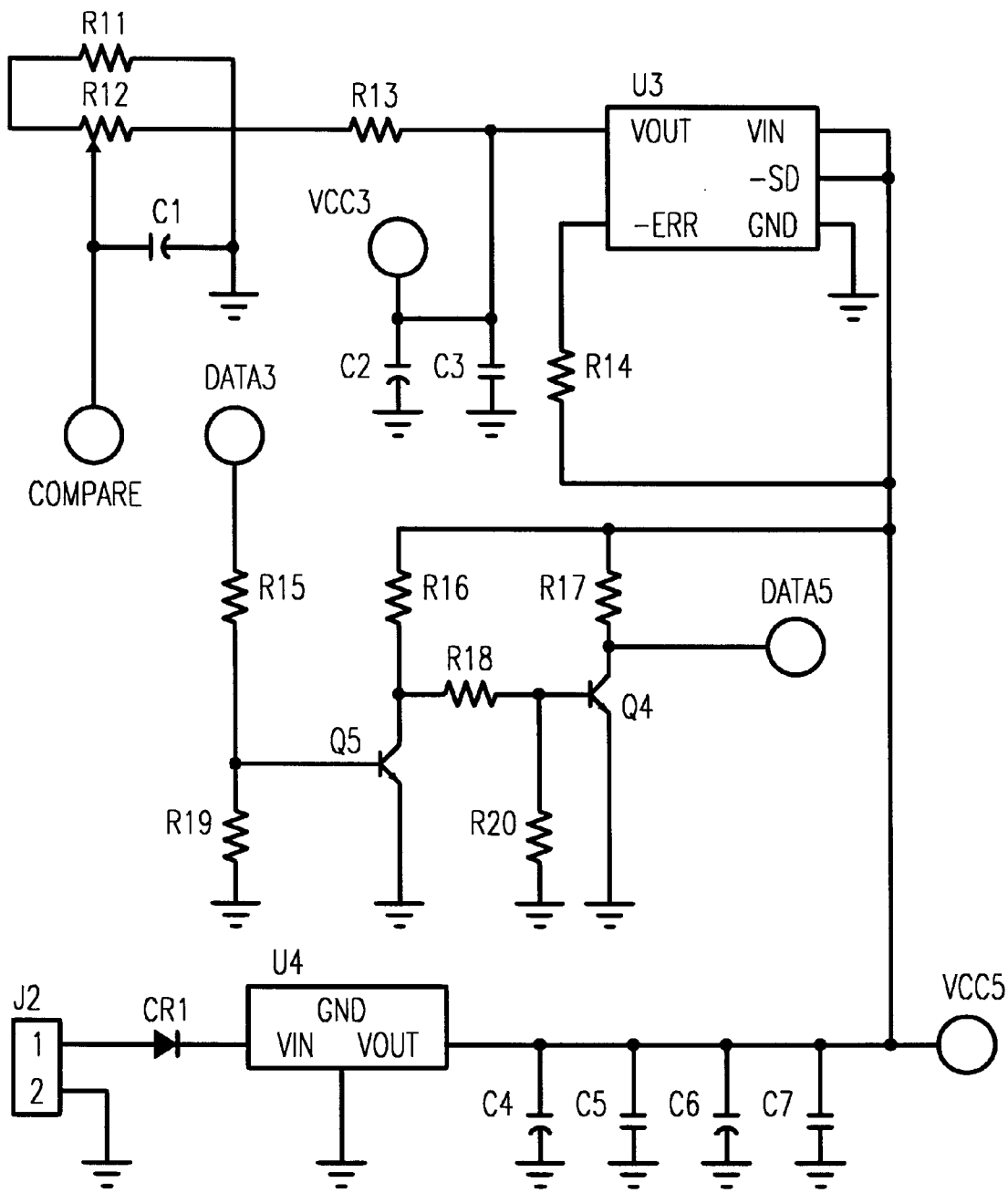
FIGS. 3a and 3b are schematics of the monitor receiver.
Figure 3B:
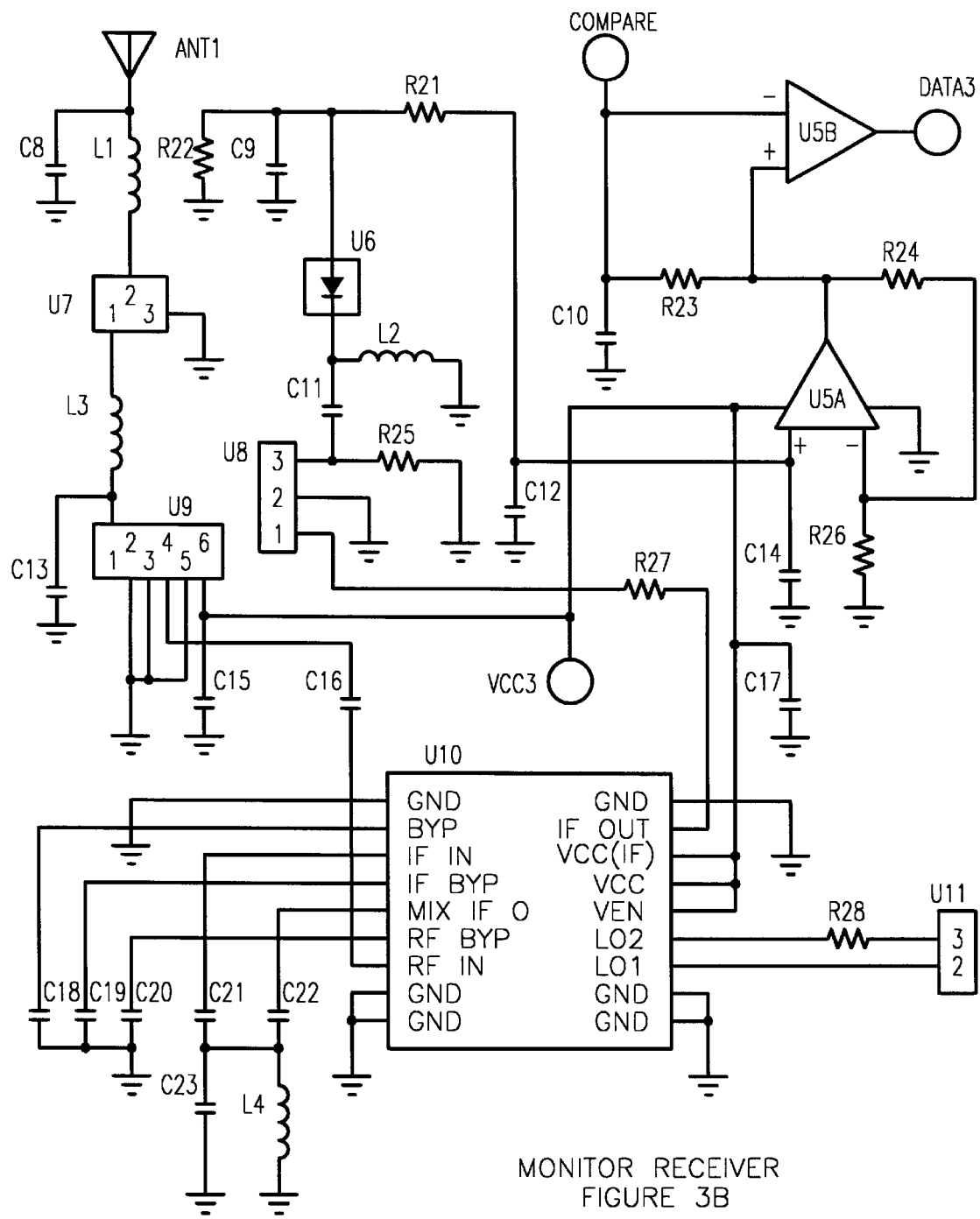

Referring to FIGS. 1 through 3b, and more particularly to FIGS. 3a and 3b, the monitor receiver obtains clean power from a five volt DC linear voltage regulator U4. The regulator U4 receives vehicular battery twelve volts DC through connector J2 and through a protection diode CR1 and provides a constant five volt supply voltage VCC5 distributed within the monitor to filter capacitors C4, C5, C6 and C7, among other components. The supply voltage VCC5 powers the receiver circuits. The receiver comprises an antenna ANT1 coupled through an inductor L1 and capacitor C8 to a SAW filter U7. The inductor L1 and capacitor C8 function to set for impedance matching between the antenna ANT1 and the SAW filter U7 and. The SAW filter U7 functions as front-end filtering for the received signal and is connected through impedance matching components inductor L3 with capacitor C13 to a low noise amplifier U9 for demodulating the received signal. The low noise amplifier U9 is powered by a three volt reference VCC3 with filter capacitors C15 and C17 and provides an RF output signal to a frequency converter U10 through coupling capacitor C16. The received signal is a 433.92 MHz RF AM signal that is picked up by the helical antenna ANT1 and processed by the frequency converter U10. The frequency converter U10 is connected to an IF tuned circuit consisting an inductor L4 and capacitors C21, C22 and C23 for providing a tuned response while eliminating unwanted cross product signals generated within the frequency converter U10. The frequency converter U10 is further connected to radio frequency (RF) and intermediate frequency (IF) bypass capacitors C18, C19 and C20. The frequency converter U10 uses a SAW resonator U11 connected through resistor R28 for generating a 423.22 MHz local oscillator signal which when mixed with the received signal at 433.92 MHz signal generates an amplitude modulated signal that is down converted to 10.7 MHz. Hence, SAW resonator U11 provides a 423.22 MHz RF reference for mixing and down converting of the received RF signal into an IF signal at the IF output of the frequency converter U10.

The frequency converter U10 provides an IF output signal to a ceramic filter U8 through resistor R27. The ceramic filter U8 provides a sharp band pass response for further filtering the IF signal. An envelope detector consists of a circuit including capacitor C11, resistor R25, inductor L2 and a detection diode U6. The output of the envelop detector at the diode U6 provides a toggling digital signal that is further filtered by resistors R22 and capacitor C9 and is communicated to a buffering low pass filter amplifier U5A. The amplifier U5a has input capacitors C12 and C14, input resistor R26 and a feed back resistor R24 providing a low pass filtered buffered signal. The filtered buffered toggling signal of the amplifier U5A is communicated to a comparator amplifier U5B that compares the buffered filtered toggling signal to the compare signal reference to square the filtered toggling signal into a square wave digital signal Data3 having fast rise and fall times suitable for further digital processing. The amplifier comparator U5B uses resistor R23 and capacitor C10 to reduce noise for precise toggling of the comparator U5B for reducing jitter of the output digital signal Data3. A step down voltage regulator U3, with resistor R14, converts the VCC5 reference into the three volt voltage reference VCC3 that is filtered by capacitors C2 and C3. Resistors R11 and R13 and potentiometer R12 divide the reference VCC3 into the compare voltage reference having a filter capacitor C1 to provide a compare threshold to amplifiers U5A and U5B to limit standbby noise. The Data3 signal isconverted by transistors Q5 and Q4, using bias resistors R15, R16, R17, R18, R19, and R20, into a five volt data signal Data5 communicated to the monitor controller. Hence, the received RF signal is converted into an IF signal that is then conditioned, filtered and detected into a VCC3 voltage level signal and then squared and converted into a VCC5 voltage level signal as a square wave form compatible with the conventional five volt logic levels of the monitor controller for communicating digital data for decoding and further processing by the monitor controller.

Figure 4:
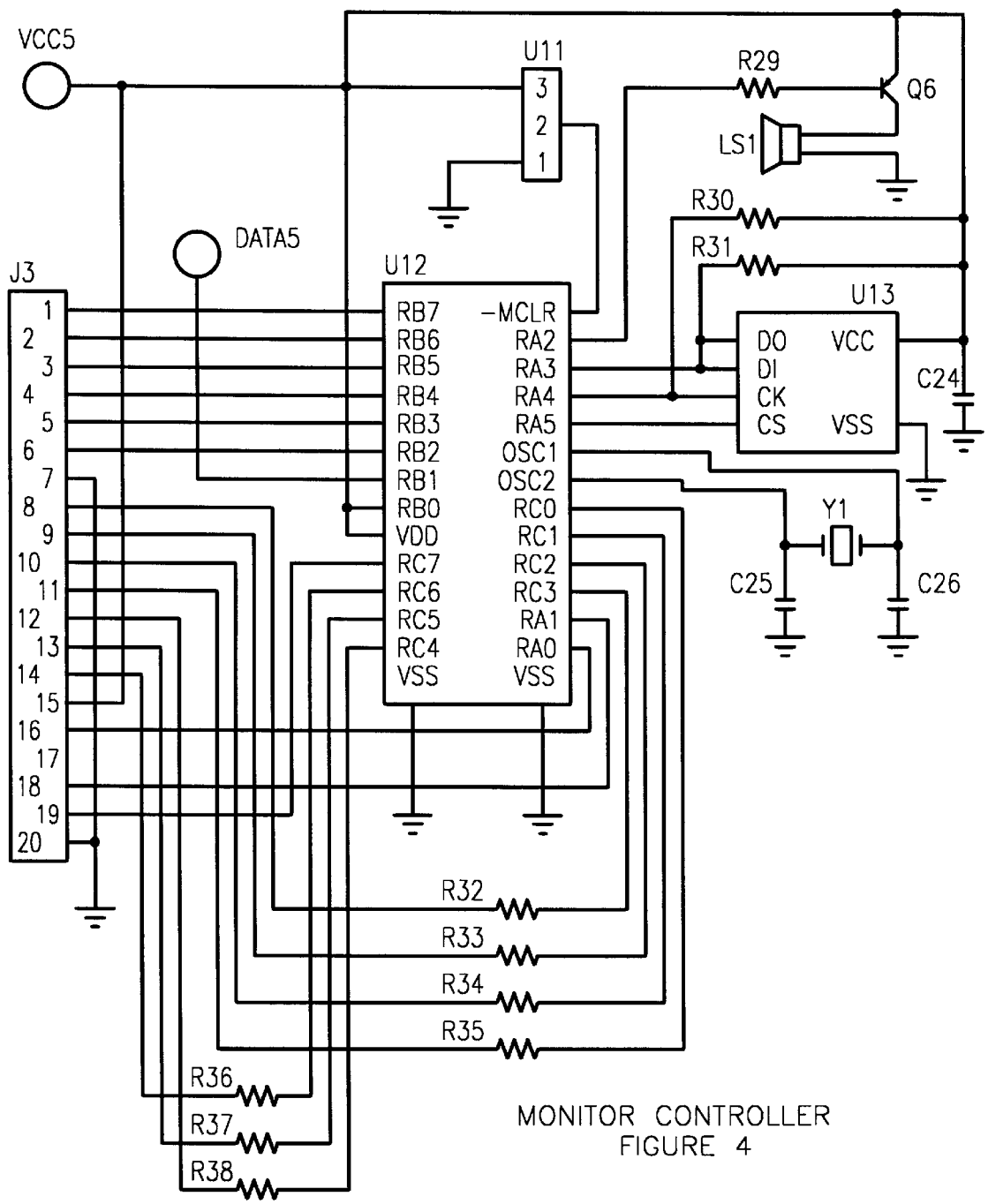
FIG. 4 is a schematic of the monitor controller.

Referring to FIGS. 1–4, and more particularly to FIG. 4, the monitor controller includes a microprocessor U12 having outputs RC0–6 connected through respective resistor R35, R34, R33, R32, R38, R37 and R36, through the display connectors J3 and J2 for respectively driving the segments f, a, b, c, , g, e, and d of the displays U1 and U2. Output RC7 drives the LED LP1. Output RB7, RB6, RB5 and RB4 respectively drive LED D1–5, and outputs RB3 and RB4 respectively drive transistors Q2 and Q3 for activating the displays U1 and U2, respectively. The input RAO receives an input from the switch S1. Thhe digital signal of Data5 isreceived at the input RB1. The microprocessor U12 is clocked by a oscillator consisting of a 4 MHz crystal oscillator Y1 connected to oscillator capacitors C25 and C26. A buzzer LS1 is a piezoelectric ceramic device driven by transistor Q6 having a base resistor R29 connected to and controlled by the microprocessor U12 at an RA2 output. The buzzer LS1 is energized by the microprocessor U12 to alert the driver when the RF receiver picks up and decodes a low tire pressure message from a tire sensor module. A one kilo bit serial electrically erasable programmable read only memory (EEPROM) U13 stores user-programmed low tire pressure trigger values, sensor module identification codes and other important parameters. The EEPROM U13 is connected to the microprocessor U12 at RA3 and RA4 data and clock inputs respectively using pull up resistors R30 and R31. The microprocessor U12 is powered by the reference VCC5 having filter capacitor C24. The microprocessor U13 is a high performance light bit CMOS microprocessor with internal 2K EPROM program memory, and one hundred and twenty eight bytes of RAM data memory. On power up, resetter U11 resets the microprocessor U12 to start execution of an operating program stored in the microprocessor EPROM. Under program control, the microprocessor U12 will illuminate each numeric display device by setting respective outputs to a logic one and by simultaneously turning on the transistors Q2 and Q3 connected to the numeric displays U1 and U2. Similarly, the microprocessor U12 can control the light emitting diodes D1–4, D5, and LP1.

Figure 5:
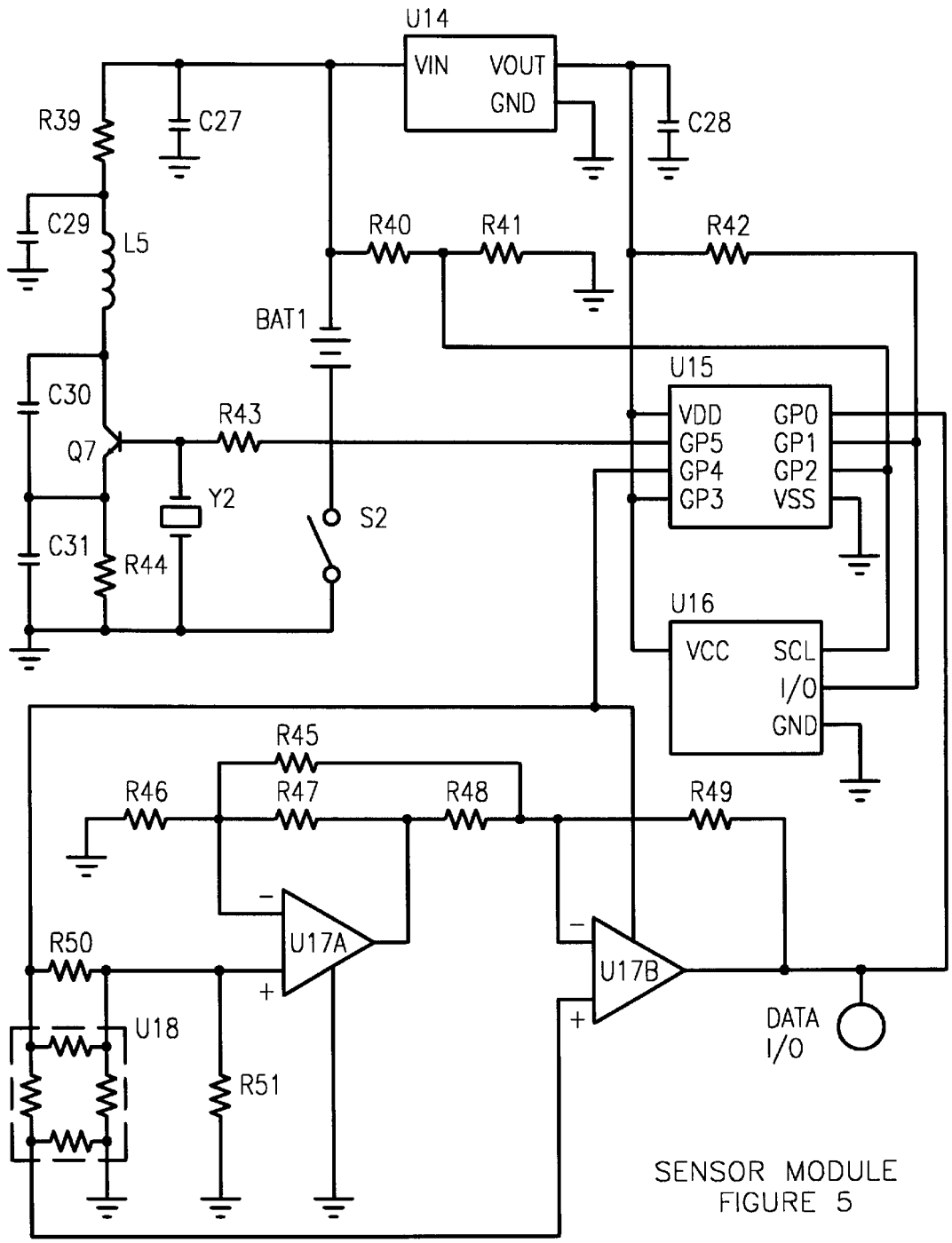
FIG. 5 is a schematic of the tire pressure sensor module.

Referring to all of the Figures, and more particularly to FIG. 5, the tire pressure sensor module is housed in a tubular miniature enclosure, not shown, and is securely fastened to a respective tire valve stem, also not shown. The tire pressure sensor module electronics enable sensory, logic and transmitter functions. A piezoresistive pressure sensor U18 comprises four strain resistive sensitive resistors diffused in silicon. These resistors are connected in a wheatstone bridge configuration whereby two resistors increase with positive pressure while the other two decrease in resistance. When pressure is applied to the sensor U18 the resistors in the arms of the bridge of sensor U18 change by an amount directly proportional to the pressure applied. When a voltage is applied to the bridge, there will be a resulting differential output voltage indicating sensed tire pressure. Sensory logic consists of a low power dual amplifier U17A and U17B connected to the sensor bridge U18 and to resistors R45 through R50, consists of a voltage regulator U14 having filter capacitor C28, and consists of another high performance CMOS eight bit microprocessor U15 with an attached EEPROM U16 using a pull resistor R42 on an GP1 input. A nine VDC battery BAT1 having filter capacitor C27 is connected to a tire motion detection switch S2. The motion detection switch S2 senses any motion of the respective vehicular tire. The switch S2 detects motions and closes switch contacts within 100 milli seconds after the vehicle reaches fifteen miles per hour. Gravitational forces activate the motion switch S2. Pure hydrogen gas is contain is a small glass container, not shown, encapsulating first and second electrical contacts. Under gravitational forces, mercury disposed on the first electrical contact flows to make contact with the second electrical contact to thereby close the switch S2. Those skilled in the art are adept at making motion detection switches sized to a small valve stem plastic casing. The battery BAT1 output voltage level is divided by resistor R40 and R41 to provide a battery voltage level reference to the microprocessor U15 to monitor the +9V battery level. Themicroprocessor U15 can sense the battery voltage reference through an input GP2 coupled to the voltage divider resistors R40 and R41. The amplifiers U17A and U17b condition the sensed tire pressure voltage signal for driving an analog-to-digital converter within the microprocessor U15 to provide the microprocessor U15 with an indication of the tire pressure sensed by the sensor U18. The radio frequency transmitter consists of transistor circuit Q7, resistors R39 and R44, inductor antenna L5, capacitors C29, C30, and C31 and a SAW resonator Y2 for providing a transmitter frequency signal at 433.92 MHz that is modulated by the microprocessor U15 through resistor R43. The GP0–5 terminals of the microprocessor U15 are bidirectional inputs and outputs. The terminal GP0 is used to receive the dataI/O signal. The terminal GP1 is used to send or receive data to the EEPROM U16. The terminal GP2 receives the battery voltage level reference and can output a digital clock signal to the EEPROM U16. The terminal GP3 is connected to the output of the regulator U14. The terminal GP4 is an output that is used to power the sensor U18 and the amplifiers U17A and U17B. The terminal GP5 outputs data to the Y2 oscillator for amplitude modulation of the 433.92 MHz radio frequency carrier signal. Under program control, the microprocessor U2 outputs an encoded digital message string DataI/O for pulsed amplitude modulating the carrier signal from the RF transmitter circuit.

To minimize power consumption, the sensor module operates in a dormant mode and is only powered when the tire is in motion detected by motion switch S2 that operates to connect the battery BAT1 to the electronic components of the sensor module. The microprocessor U15 is programmed to have an internal clock that regularly reads the air pressure in the tire from the sensor U18 through the amplifiers U17A and U17B. If there has been a significant pressure change from the previous reading, the sensor module transmits a pulse modulated radio frequency signal to the monitor using the inductor L5. The RF message identifies the sensor module and contains pressure and battery data. The monitor controller receives data indicating the current tire pressure for display and comparison. Upon receiving the RF message, the monitor controller compares the tire pressure value received to a programmed value stored in the memory. If the received value is less than a predetermined low pressure trigger value, the monitor controller alerts the driver by flashing the low tire pressure value on the displays U1 and U2, by flashing one of LEDs D1–D4 for the respective tire, and by sounding an alarm using the buzzer LS1.

The communication between the tire pressure sensor module and the monitor is unidirectional from the sensor module to the monitor controller. Transmitted signals are a logic one when the amplitude modulation level is high for two T and low for one T, or a logic zero when the amplitude modulation level is high for one T and low for two T, where T preferably equals ⅓ bit period, for example, T=270 microseconds. Messages are preferably transmitted with the most significant bits first. A message from a tire sensor module preferably consists of, in order, a preamble, a synch signal, three bytes of identification data, one byte of pressure data, one byte of full scale data, and one byte of battery data. The preamble is a 5.0 millisecond high level signal. The synch signal is a ten T pulse of low level signal. The three identification bytes is an identification number of the respective sensor module, and therefore of the respective tire to which the respective sensor module is attached. The full scale data is a calibration value indicating a maximum pressure read value. The battery data is a numerical value indicating the voltage level of the sensor module battery BAT1. The message is transmitted as an encoded RF message string.

When an encoded RF message string from the tire sensor module is received by the monitor antenna ANT1, the RF signal is passed through the saw filter U7 and through the low noise amplifier U9. The output of low noise amplifier U9 is transmitted to the single conversion super heterodyne frequency converter U10 that converts the received filtered signal into the modulated intermediate frequency signal at 10.7 MHz. The IF output is passed through a wide-band IF filter U8, and communicated to the amplitude detector U6 for demodulating the received signal. The demodulated digital data is then further processed by the DC amplifiers U5A and comparator U5B for generating the Data3 digital output. The digital output signal from U5B is passed to the voltage converter buffer of Q5 and Q4 for converting the voltage level from three volts to five volts. This five volt digital signal is then finally communicated to the microprocessor U12 for decoding, verification and further processing. If the message is determined to be from a sensor module with and ID Code belonging to one of the vehicular tires, then the tire pressure value in the message is compared with a low tire pressure trigger value previously stored in the EEPROM U13 as a low pressure comparison. If low pressure value comparison result is positive, the controller lights up the corresponding tire location LED D1–4, turns on the red color for LED LP1, and displays the tire pressure reading of the displays U1 and U2 while activating the buzzer LSI that is momentarily turned on for a predetermined period.

When a tire reaches a predetermine rotational rate corresponding to a predetermined vehicular speed, for example, fifteen miles per hour, the motion switch S2 closes to connect the battery BAT1 that powers up the electronics in the tire pressure sensor including the piezoresistive pressure sensor U18 that senses the tire air pressure level. The tire pressure is sensed by sensor U18 and the amplifier U17A amplifies the resulting differential voltage as an amplified analog signal. The amplified analog signal is fed into the amplifier U17B that converts the amplified analog signal into a digital signal communicated to the microprocessor U15. The microprocessor U15 compares the digital pressure value with a previous tire pressure reading, which is stored in the RAM of the microprocessor U15. The result of the comparison determines whether the microprocessor U15 will encode a message and communicate that message through output GP5 to the RF transmitter comprising resonator Y1 for broadcasting to the monitor antenna ANT1. The transmitted message, if any, is transmitted by inductor L5 and received by the antenna ANT1.

At the end of this transmission, the microprocessor U15 switches to a power saving mode of operation until the next wake up call. The microprocessor U15 has an emulated internal clock that counts to awaken and interrupt the microprocessor U15 at regular time intervals of time T1 to take a new tire pressure reading. The microprocessor U15 is also awakened at intervals of time T2 to transmit an all-is-well-with-the-sensor signal to the monitor. The duration of T1 is less than the duration of T2. To conserve power consumption, the tire pressure sensor module is powered down when the tire motion detection switch S2 detects no motion in the tire when the vehicular speed drops below the predetermined vehicular speed, and is powered back up again when S2 detects motion in the tire when the vehicle is traveling in excess of that predetermined speed. The microprocessor U15 also monitors the battery voltage level at input GP2 to alert the monitor controller when the battery BAT1 has dropped below a level that may result in a inaccurate tire air pressure reading by the sensor U18. The tire pressure sensor U18 can be calibrated at the factory to compensate for pressure reading imprecision between piezoresistive pressure sensor U18 when exposed to extreme temperatures. For this purpose, the microprocessor U15 can store pressure offsets values in the integrated non-volatile EEPROM. The values are programmed into microprocessor U15 through inputs GP0 receiving DATAI/O signal and a clock signal at GP1.

The above system functions to monitor tire air pressures using respective sensor modules. The tubular sensor modules are preferably marked, for example, FL, FR, BL and BR markings respectively indicating the front left, front right, back left and back right. The sensor modules are placed on the valve stem of the tire in the respective location. The monitor is preferably preprogrammed at the factory to assign the respective identification code of the sensor modules to the respective tire location. Each sensor module type, indicated by the sensor markings, has a different preprogrammed staggered time value. Each sensor module of the same marking type is preprogrammed at the factory to transmit messages at predetermined amount of staggered time after motion is detected by the motion switch. For example, sensor module marked FL transmits messages at 0.0 seconds and repetitively every 16.0 seconds thereafter after motion detection, sensor module marked ER transmits messages at 4.0 seconds and repetitively every 16.0 seconds thereafter after motion detection, sensor module marked BL transmits messages at 8.0 seconds and repetitively every 16.0 seconds thereafter after motion detection, and sensor module marked FL transmits a message at 12.0 seconds and repetitively every 16.0 second thereafter after motion detection. In this manner, every 16.0 seconds is time divided into four non-overlapping staggered time segments. As such, cross interference between the transmitted messages is reduced.

In a further aspect of the invention, the monitor system can be programmed to set the low tire pressure trigger level. The sensors have respective identification codes assigned to respective tire locations for referencing a received message to the respective tire. To enter a trigger programming mode, upon the application of power to the monitor, an operator presses the switch S1 for a predetermined amount of time, for example, three second. After entering the trigger mode, the operator can repetitively press the switch S1 to cycle through air pressure values, for example, between 18.0 psi and 50.0 psi, to thereby set the low pressure trigger level. In the event that any one of the pressure values of the received messages drops below this trigger level, the respective LED D1–D4 is flashed as the LED LP1 is illuminated red and the buzzer LS1 is activated.

In yet a further aspect of the inventions, the monitor system can be programmed to reassign the identification codes to different tire locations. For example, if a sensor is lost, stolen and becomes defective, the operator could order a replacement sensor module preprogrammed with the correct staggering time, but now having a new identification code so that all of the sensors may have respective unique ID codes so that monitors will only response to sensor modules on the subject vehicle. Upon the application of power, the user can hold press the switch S1 for a longer predetermined amount of time, for example six seconds, to enter the assignment programming mode. After entering the assignment mode, the operator can repetitively push the switch S1 to cycle through the tire location D1–D4 to select the tire location for the new sensor module. After the sensor module is placed on the valve stem of the subject tire, with the other sensors removed from the remaining tires, and with the monitor in the assignment mode, the vehicle can be driven into motion to activate the motion switch of the sensor module to activate the transmission of a message containing the new ID code. Upon reception of the message, the monitor controllers assigns the received ID code to the selected tire location. In this way, new sensors can replaced if lost, stolen or defective.

The above system and methods describe a preferred embodiment using exemplar devices and methods that are subject to further enhancements, improvement and modifications. However, those enhancements, improvements and modifications may nonetheless fall within the spirit and scope of the following claims.

What is claimed is:

1. A system for monitoring tire pressures respectively for a plurality of tires of a vehicle, the system comprises a plurality of sensor modules respectively attached to the plurality of tires and comprises a monitor, the plurality of sensor modules respectively comprise:
a plurality of motion switches for detecting when the vehicle is in motion, each of the plurality of motion switches detects when the vehicle has reached a predetermined vehicular speed;
a plurality of sensors for respectively sensing the plurality of tire pressures,
a plurality of transmitters for respectively broadcasting a plurality of messages respectively for the plurality of tires, the plurality of transmitters broadcasting when the vehicle has reached the predetermined vehicular speed, the plurality of messages indicating the plurality of tire pressures and identifying the respective plurality of tires, the plurality of transmitters respectively broadcast the plurality of messages at the respective plurality of differing synchronized staggered times after the motion switches detect when the vehicle has reach the predetermined vehicular speed; and the monitor comprising:
a receiver for receiving the plurality of messages, and
a display for displaying an indication of the plurality of tire pressures.

2. The system of claim 1 wherein each of the plurality of messages further indicates an identification code identifying a respective of the plurality of sensor modules.

3. The system of claim 1 wherein each of the plurality of sensor modules further comprises a battery for providing power to the respective sensor and to the respective transmitter, the battery supplying power to the respective sensor module after the motion switches detect the predetermined vehicular speed.

4. The system of claim 1 wherein the plurality of sensor modules respectively further comprise,
a plurality of batteries for respectively providing power to the plurality of transmitters and to the plurality of sensors, the plurality of sensors for respectively generating a plurality of tire pressure signals, and
a plurality of microprocessors respectively powered by the plurality of batteries and for respectively receiving the plurality of tire pressure signals, and for respectively generating the plurality of messages as plurality of digital signals respectively communicated to the plurality of transmitters, the plurality of transmitters then serving to respectively modulate a plurality of carrier signals by the plurality of digital signals to broadcast the plurality of messages at the respective plurality of differing synchronized staggered times.

* * * * *